(12) United States Patent
Mohamed et al.

(10) Patent No.: US 10,637,273 B2
(45) Date of Patent: Apr. 28, 2020

(54) INTEGRATED BIDIRECTIONAL INDUCTIVE/CONDUCTIVE ELECTRICAL APPARATUS

(71) Applicants: Ahmed A. S. Mohamed, Miami, FL (US); Osama A. Mohammed, Miami, FL (US)

(72) Inventors: Ahmed A. S. Mohamed, Miami, FL (US); Osama A. Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 27 days.

(21) Appl. No.: 15/848,445

(22) Filed: Dec. 20, 2017

(65) Prior Publication Data

US 2019/0190299 A1 Jun. 20, 2019

(51) Int. Cl.
*H02J 7/02* (2016.01)
*H02J 7/00* (2006.01)
(Continued)

(52) U.S. Cl.
CPC .............. *H02J 7/025* (2013.01); *B60L 53/12* (2019.02); *B60L 53/14* (2019.02); *H02J 7/0068* (2013.01); *H02J 7/022* (2013.01); *H02J 50/00* (2016.02); *H02J 50/12* (2016.02); *H02M 3/33584* (2013.01); *B60L 2210/10* (2013.01); *B60L 2210/30* (2013.01); *B60L 2210/40* (2013.01); *H02M 2007/4815* (2013.01)

(58) Field of Classification Search
CPC .. H02J 7/022; H02J 7/025; H02J 50/10; H02J 50/12; B60L 11/1816; B60L 11/182; Y02T 10/7005; Y02T 10/7072

USPC ........................................................ 320/108
See application file for complete search history.

(56) References Cited

U.S. PATENT DOCUMENTS

2011/0254379 A1* 10/2011 Madawala .............. H02J 5/005
307/104
2012/0153717 A1* 6/2012 Obayashi ............ B60L 11/1816
307/9.1

(Continued)

OTHER PUBLICATIONS

Mohamed et al., "Experimental validation of comprehensive steady-state analytical model of bidirectional WPT system in EVs applications," IEEE Transactions on Vehicular Technology, Dec. 2016, pp. 1-10.

(Continued)

*Primary Examiner* — Richard Isla
*Assistant Examiner* — Johali A Torres Ruiz
(74) *Attorney, Agent, or Firm* — Saliwanchik, Lloyd & Eisenschenk

(57) ABSTRACT

A bidirectional inductive and conductive electrical apparatus can include: an inverter including a first inverter leg, a second inverter leg, and a control switch disposed between a first upper node of the first inverter leg and a second upper node of the second inverter leg; and an inductor component connecting a first middle node the first inverter leg and a second middle node of the second inverter leg, the control switch configured to connect the first upper node to the second upper node under an ON state during inductive power transfer and configured to disconnect the first upper node from the second upper node under an OFF state during conductive power transfer.

18 Claims, 4 Drawing Sheets

(51) Int. Cl.
  *H02J 50/12*   (2016.01)
  *H02M 3/335*   (2006.01)
  *B60L 53/14*   (2019.01)
  *B60L 53/12*   (2019.01)
  *H02J 50/00*   (2016.01)
  *H02M 7/48*    (2007.01)

(56) References Cited

U.S. PATENT DOCUMENTS

| | | | | |
|---|---|---|---|---|
| 2012/0306439 | A1* | 12/2012 | Ichikawa | B60L 11/14 320/108 |
| 2013/0285602 | A1 | 10/2013 | Nergaard et al. | |
| 2016/0094080 | A1* | 3/2016 | Dong | H01M 10/4257 320/108 |
| 2017/0072807 | A1* | 3/2017 | Matsumoto | H02J 7/0055 |
| 2018/0041060 | A1* | 2/2018 | Walley | H02J 7/0055 |
| 2018/0062430 | A1* | 3/2018 | Matsumoto | H02J 50/10 |
| 2018/0287405 | A1* | 10/2018 | Govindaraj | H02J 7/0055 |

OTHER PUBLICATIONS

Madawala et al., "A bidirectional inductive power interface for electric vehicles in V2G systems," IEEE Transactions on Industrial Electronics, Oct. 2011, pp. 4789-4796, vol. 58, No. 10.

Esteban et al., "A comparative study of power supply architectures in wireless EV charging systems," IEEE Transactions on Power Electronics, Nov. 2015, pp. 6408-6422, vol. 30, No. 11.

Li et al., "Wireless power transfer for electric vehicle applications," IEEE Journal of Emerging and Selected Topics in Power Electronics, Mar. 2015, pp. 4-17, vol. 3, No. 1.

Zhang et al., "Compensation topologies of high-power wireless power transfer systems," IEEE Transactions on Vehicular Technology, Jun. 2016, pp. 1-10.

Sahu et al., "A low voltage, dynamic, noninverting, synchronous buck-boost converter for portable applications," IEEE Transactions on Power Electronics, Mar. 2004, pp. 443-452, vol. 19, No. 2.

Mohamed et al., "Modeling and assessment analysis of various compensation topologies in bidirectional IWPT system for EV applications," IEEE Transactions on Industry Applications, Sep./Oct. 2017, pp. 4973-4984, vol. 53, No. 5.

Mohamed et al., "Steady-state performance assessment of different compensation topologies in two-way IWPT system for EV ancillary services," IEEE Industry Applications Society Annual Meeting, Oct. 2016, pp. 1-8.

Mohamed et al., "Modeling and feasibility analysis of quasi-dynamic WPT system for EV applications," IEEE Transactions on Transportation Electrification, Jun. 2017, pp. 343-353, vol. 3, No. 2.

Erickson et al., "Principles of steady-state converter analysis," Fundamentals of Power Electronics, Jan. 2001, pp. 13-34, Springer.

* cited by examiner

INTEGRATED BIDIRECTIONAL INDUCTIVE/CONDUCTIVE ELECTRICAL APPARATUS

BACKGROUND

A unidirectional integrated inductive/conductive charger provides a system that allows an energy storage system (ESS) to charge using both inductive and conductive options [1]. In [1], two parallel separate hardware controllers are installed on the ESS's side for the wired and wireless charging. This leads to extra cost and weight that are added to the ESS. In addition, this integrated inductive/conductive charger supports only the unidirectional operation (charging only) and does not support bidirectional operation (charging and discharging).

BRIEF SUMMARY

Embodiments of the subject invention provide novel and advantageous integrated bidirectional inductive and conductive electrical apparatuses that can incorporate a conductive (wired) connection and an inductive (wireless) connection into an energy storage system (ESS), thereby achieving bidirectional operation (charging and discharging) through both the wired and wireless connection.

In an embodiment, a bidirectional inductive and conductive electrical apparatus can comprise: an inverter including a first inverter leg, a second inverter leg, and a switch placed between a first upper node of the first inverter leg and a second upper node of the second inverter leg; and an inductor component connecting a first middle node the first inverter leg and a second middle node of the second inverter leg; the switch configured to connect the first upper node to the second upper node under ON state during inductive power transfer and configured to disconnect the first upper node from the second upper node under OFF state during conductive power transfer.

In another embodiment, an integrated bidirectional inductive and conductive power transfer system can comprise: a primary side circuit including a first full bridge converter; a secondary side circuit including a second full bridge converter and transferring power wirelessly between the primary side circuit; and a controller determining a connection mode of the secondary side circuit by controlling a switch of the second full bridge converter and determining an operation mode of the secondary side circuit.

In yet another embodiment, an integrated bidirectional inductive and conductive power transfer system can comprise: a secondary first switch placed between a first upper node and a first middle node; a secondary second switch placed between the first middle node and a first lower node; a secondary third switch placed between a second upper node and a second middle node; a secondary fourth switch placed between the second middle node and a second lower node; a switch placed between the first upper node and the second upper node; a secondary inductor component placed between the first middle node and the second middle node and including a secondary power pad and a secondary compensation network; and a controller controlling the switch such that the power transfer system operates under inductive power transfer mode by connecting the first upper node and the second upper node and operates under conductive power transfer mode by disconnecting the first upper node and the second upper node; the first upper node and the first lower node configured to be connected to a direct current (DC) bus under the conductive power transfer mode; and the second upper node and the second lower node configured to be connected to a battery.

DETAILED DESCRIPTION

Embodiments of the subject invention provide novel and advantageous integrated bidirectional inductive and conductive electrical apparatuses that can incorporate a conductive (wired) connection and an inductive (wireless) connection into an ESS, thereby achieving bidirectional operation (charging and discharging) through both the wired and wireless connection.

Many technologies have presented a solution for integrating and connecting a energy storage system (ESS), such as an electric vehicle (EV), cell phone, or laptop with the surrounding infrastructures, such as the power grid or another energy storage system. This connection can be achieved by one of conductive (wired) technology or inductive (wireless) technology.

This connecton technology can be implemented as an interface to charge and discharge the electric vehicles and achieve vehicle-to-X and X-to-vehicle services, where X can be the power grid, building grid, road, or another electric vehicle. In addition, it can be implemented with other ESSs such as a cell phone or laptop to allow the bidirectional power-flow in these systems using both the wired and wireless options.

Figure 1:
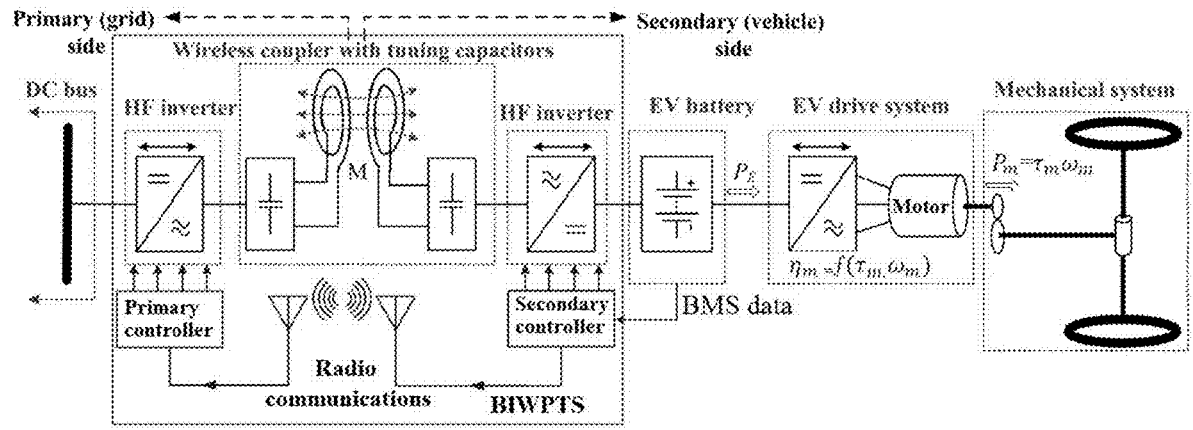
FIG. 1 shows a block diagram of an electric vehicle (EV) power-train system connected with a bidirectional inductive wireless power transfer system (BIWPTS).

An example of an ESS is an EV, and FIG. 1 shows a block diagram of an EV power-train system connected with a bidirectional inductive wireless power transfer system (BIWPTS) with respect to the EV. Referring to FIG. 1, the power-train system is bidirectional to allow the EV to be charged and discharged wirelessly. It comprises three main parts: a bidirectional inductive wireless power transfer system (BIWPTS); a battery; and a drive system. The BIWPTS has two isolated sides: the grid (primary); and vehicle (secondary). The two sides communicate to each other through radio communication. The power flow between the two sides is managed by the secondary controller.

The BIWPTS has a dual active side based on a full bridge converter in each side, to support the bidirectional power-flow between the EV and other resources, to be able to charge and discharge its battery. The charging process is necessary for driving performance and enabling the EV to reach its destination. The discharging operation is useful to support the power grid [vehicle-to-grid (V2G)], home micro-grid [vehicle-to-home (V2H)], or other vehicle [vehicle-to-vehicle (V2V)]. Moreover, it helps to get the benefits for the stored energy inside the ESS, during idle situation. In the BIWPTS, the power transfers between the primary and secondary sides, through a large air-gap by magnetic induction, while the system operating at resonance condition. The energy transfer operation may occur while the EV is in a long-term parking, such as parking garage, charging station, public parking or private parking, which is called stationary wireless power transfer (WPT). Also, it may happen during the transient stops, such as bus stops for electric buses or traffic signals for EVs (quasi-dynamic WPT). In addition, the power transfer may occur during the driving, using the powered roads (dynamic WPT).

Figure 2:
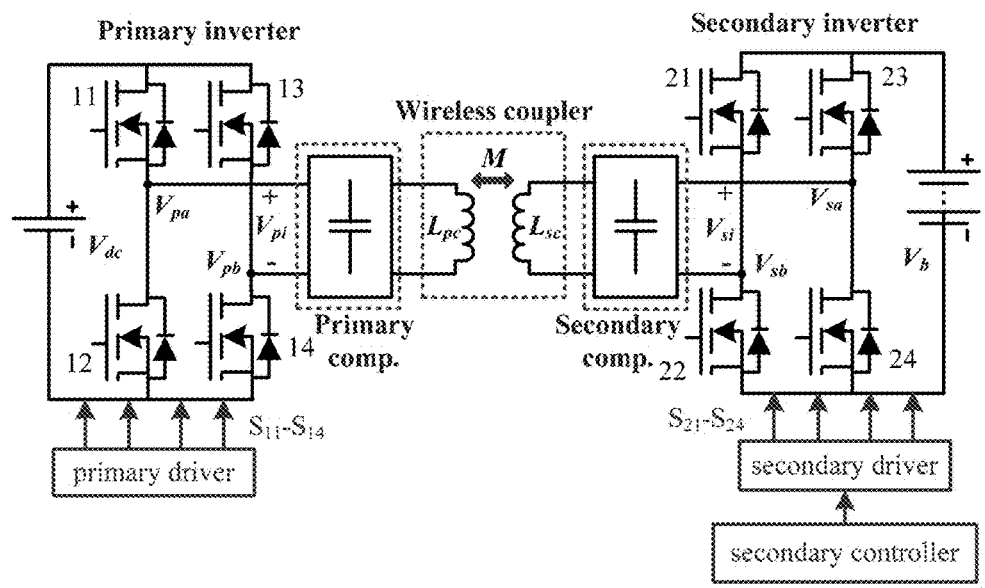
FIG. 2 shows a block diagram of the BIWPTS.

FIG. 2 shows a block diagram of a BIWPTS. Referring to FIG. 2, the BIWPTS comprises two electrically isolated sides: a primary (grid); and secondary (vehicle) side. The primary side is coupled with a direct current (DC)-bus and placed beneath the vehicle in the road, while the secondary side is attached to the EV's battery and placed inside the vehicle. Each side comprises a high frequency H-bridge converter (HFHBC), controller, compensation circuit, and the wireless pad, as shown in FIG. 2.

The two sides are loosely coupled by magnetic induction through a large air gap. During the charging operation, the DC power is converted to HF AC by the primary inverter to supply the primary pad represented as $L_{pc}$. The primary power moves by magnetic induction to the secondary pad represented as $L_{sc}$, through the air-gap. The magnetic induction is performed by the wireless coupler including the primary pad and the secondary pad. The secondary power is rectified by another converter to charge the EV's battery. The compensation networks including a primary compensation and a secondary compensation are essential to compensate the large reactive power required to magnetize the wide air gap. These networks can be a single capacitor or a combination of LC circuit. In discharging mode, the power transfers from the EV to the DC-bus through the same path. The power flow between the two sides is managed by controlling the switching of the two HF converters, based on a secondary controller placed on the EV's side.

With respect to the power transfer system of FIGS. 1 and 2, the available solution to provide the conductive connection (wired connection) option is to add a DC-DC converter with its own controller between the DC-bus and the EV. This means that two different systems need to be installed inside the EV.

The embodiment of the subject invention uses the same setup shown in FIG. 2 to support both the conductive and inductive connections. In the embodiment, the bidirectional power flow between EVs and the power grid or the other infrastructures can be achieved, either by the wired (conductive) or wireless (inductive) connection, using the same setup. Removal of cables, autonomy for the driver, safety in operation, and relatively low maintenance have improved the practicality of wireless technology. The combination between the wired and wireless connection is expected to significantly improve the reliability of having more energy available for vehicle services and improved transportation electrification. The wireless option enables the continuous charging and discharging of EV during the day, which decreases the required battery capacity and size, and, in consequence, decreases the vehicle cost. The wired option can be used during the long term parking at home or work, when the wireless option is not available.

Figure 3:
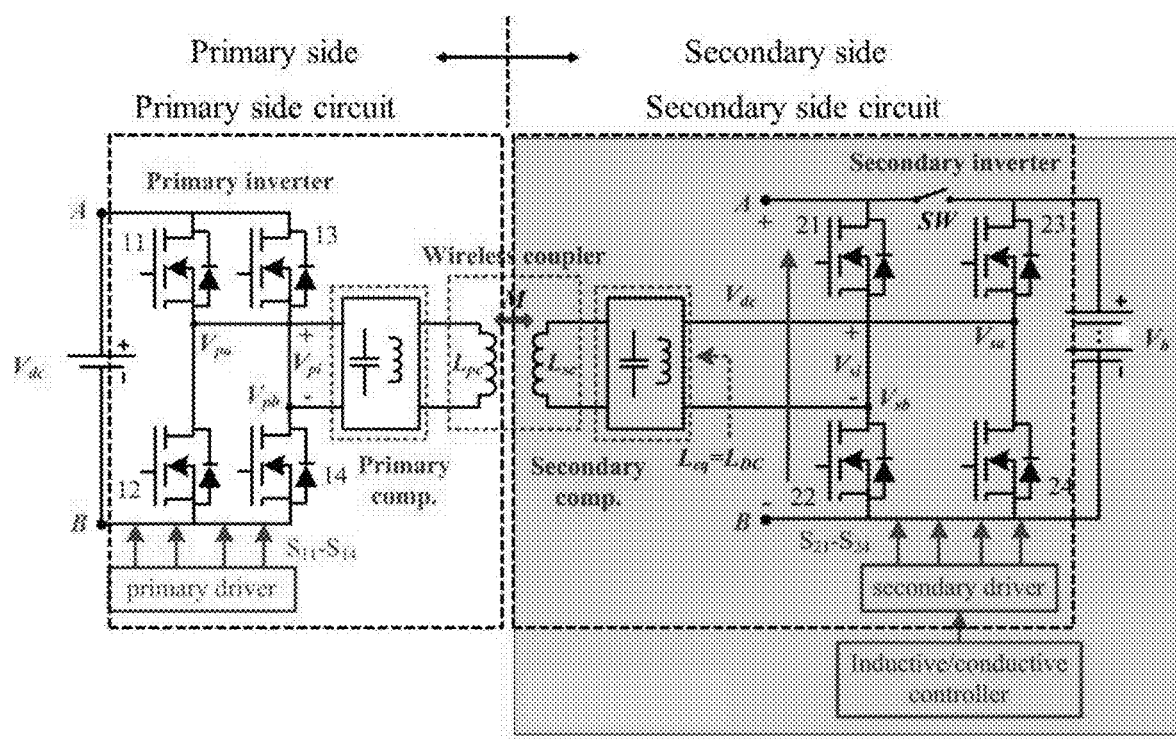
FIG. 3 shows a bidirectional inductive and conductive power transfer system according to an embodiment of the subject invention.
Figure 4:
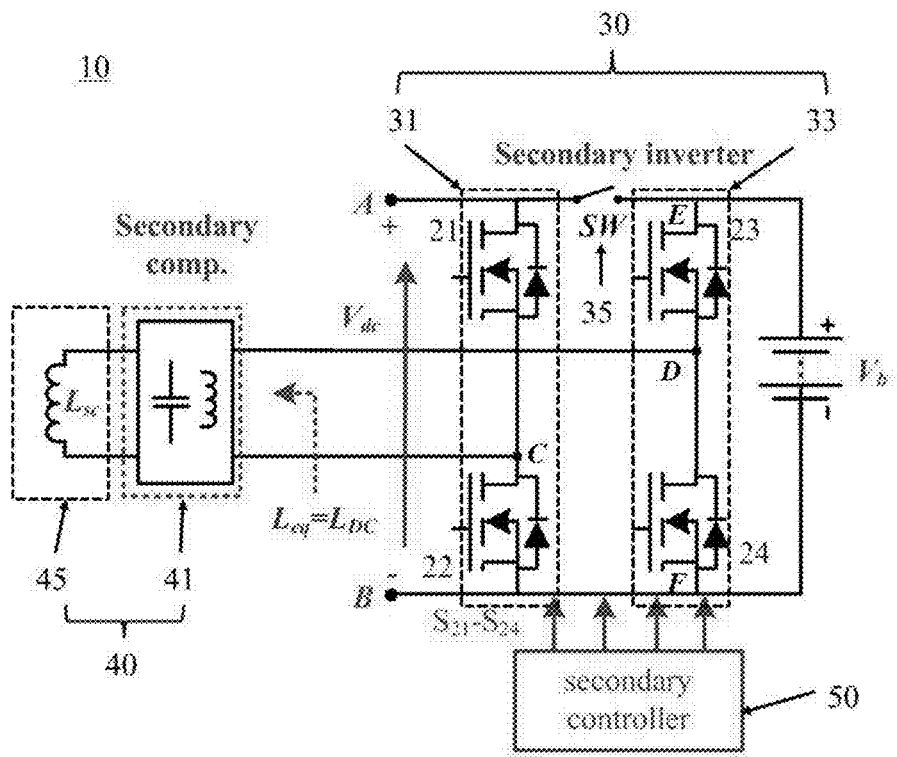
FIG. 4 shows a bidirectional inductive and conductive electrical apparatus according to an embodiment of the subject invention.

FIG. 3 shows an integrated bidirectional inductive and conductive power transfer system according to an embodiment of the subject invention, and FIG. 4 shows a bidirectional inductive and conductive electrical apparatus according to an embodiment of the subject invention. The integrated bidirectional inductive/conductive power transfer system (IBICPTS) with the DC-bus configuration, as shown in FIG. 3, comprises two electrically isolated sides: ground (primary) and vehicle (secondary). During the inductive power transfer (IPT), the two sides exist and are aligned together with an air-gap between them. During the conductive power transfer (CPT), only the secondary side (shaded area) exists, since the primary side of the wireless system is not available, as indicated in FIG. 4. The hardware in the secondary side is adjusted to form a bidirectional DC-DC buck-boost converter. The DC-bus is connected directly to the points A and B. Also, an ideal switch SW is added to isolate the two inverters' legs. This switch SW is ON during the IPT, and OFF during the CPT. In addition, the combination of the power pad and the compensation network is utilized to represent the required inductor of the DC-DC converter. The equivalent reactance of this combination is controlled by adjusting the switching frequency of the DC-DC converter.

Referring to FIG. 4, the integrated bidirectional inductive and conductive electrical apparatus 10 comprises an inverter 30 including a first inverter leg 31 and a second inverter leg 32. The inverter 30 functions as the HFHBC during the IPT, thus comprises a first switch 21 between a first upper node A and a first middle node C, a second switch 22 between the first middle node C and a first lower node B, a third switch 23 between a second upper node E and a second middle node D, and a fourth switch 24 between the second middle node D and a second lower node F. In addition, the apparatus 10 further comprises an inductor component 40 including a power pad 45 and a compensation network 41. The first upper node A is coupled to the second upper node E, the first lower node B is coupled to the second lower node F, and the first middle node C is coupled to the second middle node D through the inductor component 40.

For the CPT, the apparatus 10 operates as the DC-DC converter, thus the apparatus 10 further comprises a control switch 35 between the first upper node A and the second upper node E in order to connect or disconnect the first and second upper nodes. When the control switch 35 is under ON state connecting the first upper node A to the second upper node E, the apparatus 10 operates under the IPT mode, and when the control switch 35 is under OFF state disconnecting the first upper node A from the second upper node E, the apparatus 10 operates under the CPT mode. The control switch 35 can be controlled by the secondary controller 50 so as to selectively connect the first upper node A to the second upper node E.

Figure 5:
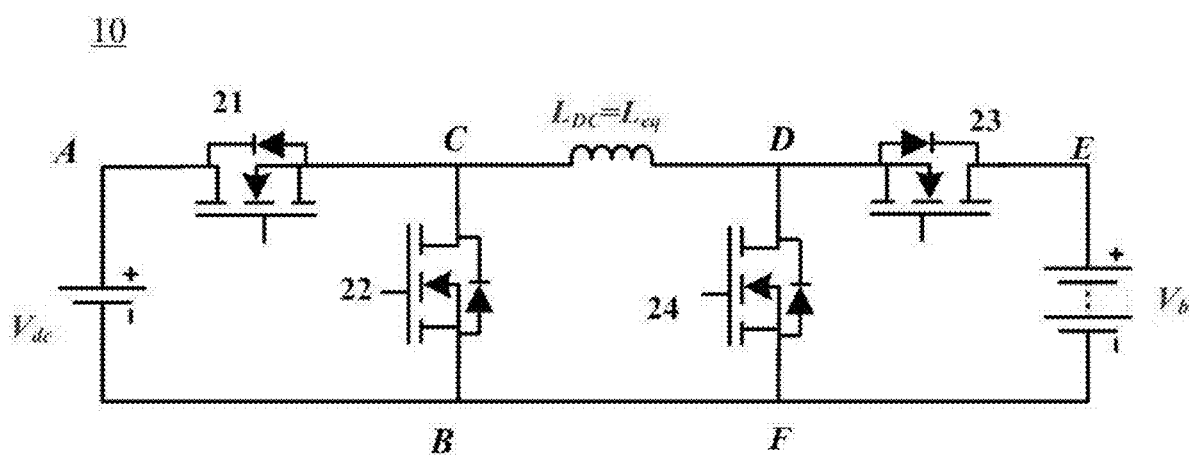
FIG. 5 shows a bidirectional non-inverting buck-boost converter according to an embodiment of the subject invention.

When the control switch 35 is under the OFF state, the apparatus 10 becomes the DC-DC converter, in particular, a bidirectional non-inverting buck-boost converter (BNBBC) as shown in FIG. 5. FIG. 5 shows an equivalent circuit to the apparatus 10 when the control switch 35 disconnects the first upper node A from the second upper node E. This BNBBC topology offers low number of passive components, so it is cost-effective and more compact compared to other topologies. The other advantage of the BNBBC for this embodiment of the subject invention is that it could be simply realized, using the HFHBC structure that is utilized as a bidirectional inverter, in either the primary and secondary sides of the WPT setup.

Referring to FIGS. 4 and 5, the first upper node A and the first lower node B are configured to be connected to the DC-bus having a DC-bus voltage $V_{dc}$, and the second upper node E and the second lower node F are configured to be connected to a battery having a battery voltage $V_b$. In this structure, the output voltage could be either higher or lower than the input voltage, depending on the DC-bus voltage $V_{dc}$ and the battery voltage $V_b$ levels. Both the inductive and the conductive options are able to handle the bidirectional power-flow, regardless of the relation between $V_{dc}$ and $V_b$, which can be: 1) $V_{dc}>V_b$, 2) $V_{dc}<V_b$, and 3) $V_{dc}\approx V_b$. In the first two situations, the system behaves either as a buck or a boost converter, based on the power-flow direction (charge or discharge), while in the third situation system works as a buck-boost converter.

The equivalent inductance $L_{eq}$ of the power pad 45 and the compensation network 41 is utilized to provide the inductor value $L_{DC}$ that is required in the DC-DC converter for the wired option. This $L_{eq}$ depends on the compensation topology implemented on the secondary side of the IPT system, which can be a series capacitor, a parallel capacitor, or a combination of capacitors and inductors. The equivalent inductance $L_{eq}$ for the most common three topologies including LC-series, LC-parallel, and LCL, is given in Equation (1).

$$L_{eq}(LC-\text{series}) = \frac{1}{C_s\omega_s^2} - L_{sc} \quad (1)$$

$$L_{eq}(LC-\text{parallel}) = \frac{L_{sc}}{1 - C_sL_{sc}\omega_s^2}$$

$$L_{eq}(LCL) = \frac{L_{sc} + L_{si} - L_{sc}L_{si}C_s\omega_s^2}{1 - C_sL_{sc}\omega_s^2}$$

where, $L_{sc}$ represents the secondary pad self-inductance, $C_s$ is the secondary capacitor, $L_{si}$ is a series filter inductance inserted between the capacitor and the HFHBC (i.e. inverter 30), and $\omega_s$ is the operating frequency of the wireless system, which typically is the system resonant frequency.

The desired inductance for the DC-DC converter is subject to some limitations, related to the input and output DC voltages, desired current ripple, and the switching frequency. The input and output voltages, and the current ripple are design targets, and they cannot be controlled. Thus, the embodiment of the subject invention adjusts the switching frequency of the DC-DC converter, such that the desired value of $L_{DC}$ is obtained from the combination of the power pad and the compensation network ($L_{DC}=L_{eq}$).

Figure 6:
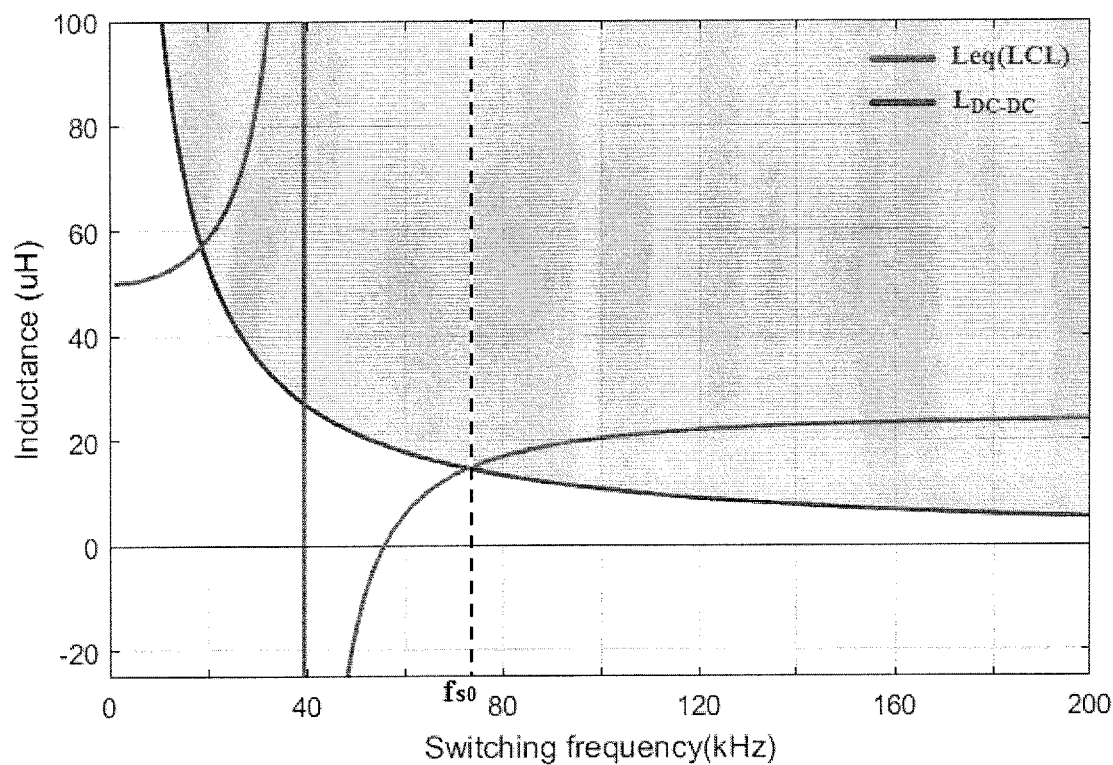
FIG. 6 shows an inductor design of FIG. 5 based on a switching frequency.

In an embodiment, the equivalent inductance of the LCL topology, $L_{eq}$ (LCL) in Equation (1), is analyzed against the switching frequency ($f_s$), as shown in FIG. 6. FIG. 6 shows an inductor design of FIG. 5 based on a switching frequency. Referring to FIGS. 3-6, the acceptable operating region of $L_{DC}$ is shown by the shaded area, based on Equation (2).

$$L_{DC\_limit} > \left(\frac{V_{in}}{V_{out}}\right)\frac{(V_{out}-V_{in})}{2f_s\Delta I_L} \quad (2)$$

where, $\Delta I_L$ and $f_s$ are the inductor current ripple and the switching frequency of the buck-boost converter.

As can be seen, by adjusting the switching frequency, the desired inductor $L_{DC}$ that complies with the inductance constraint given in Equation (2) can be obtained.

The switching among the different connections (wired or wireless) and modes of operation (charging and discharging) is accomplished, using one controller implemented inside the EV. During the wireless connection, the controller generates the switching activities of both the primary and secondary HFHBCs. In the wired connection, the controller generates the switching signals of the BNBBC, to manage the bidirectional power-flow. The controller will operate the BNBBC as a buck, boost, or buck-boost, based on the DC voltage levels ($V_{dc}$ and $V_b$) and the mode of operation (charging or discharging). The different cases of operation are summarized in Table I.

TABLE I

The Different Modes of Operation of the Invented System.

| Condition | Mode | Operation |
|---|---|---|
| $V_{dc} > V_b$ | Charging | Buck |
| | discharging | Boost |
| $V_{dc} < V_b$ | Charging | Boost |
| | discharging | Buck |
| $V_{dc} \approx V_b$ | Charging | buck-boost |
| | discharging | buck-boost |

The subject invention includes, but is not limited to, the following exemplified embodiments.

Embodiment 1. A bidirectional inductive and conductive electrical apparatus, comprising:

an inverter including a first inverter leg, a second inverter leg, and a control switch disposed between a first upper node of the first inverter leg and a second upper node of the second inverter leg; and an inductor component connecting a first middle node the first inverter leg and a second middle node of the second inverter leg, the control switch configured to connect the first upper node to the second upper node under an ON state during inductive power transfer and configured to disconnect the first upper node from the second upper node under an OFF state during conductive power transfer.

Embodiment 2. The bidirectional inductive and conductive electrical apparatus according to embodiment 1, the first inverter leg including a first switch between the first upper node and the first middle node and a second switch between the first middle node and a first lower node of the first inverter; the second inverter leg including a third switch between the second upper node and the second middle node and a fourth switch between the second middle node and a second lower node of the second inverter; and the first lower node being connected to the second lower node.

Embodiment 3. The bidirectional inductive and conductive electrical apparatus according to any of embodiments 1-2, the inductor component comprising a power pad and a compensation network.

Embodiment 4. The bidirectional inductive and conductive electrical apparatus according to embodiment 3, the compensation network being at least one of a series capacitor connected to the power pad in series, a parallel capacitor connected to the power pad in parallel, and a combination of the series capacitor and the parallel capacitor.

Embodiment 5. The bidirectional inductive and conductive electrical apparatus according to any of embodiments 1-4, an inductance of the inductor component being determined by adjusting a switching frequency of the bidirectional inductive and conductive electrical apparatus.

Embodiment 6. The bidirectional inductive and conductive electrical apparatus according to any of embodiments 1-5, further comprising a controller adjusting the switching frequency during a conductive power transfer (CPT).

Embodiment 7. The bidirectional inductive and conductive electrical apparatus according to any of embodiments 2-6, the first to fourth switches being semi-conductor switches such as transistors (e.g., n-type metal-oxide-semiconductor field-effect transistor (nMOSFET)).

Embodiment 8. The bidirectional inductive and conductive electrical apparatus according to any of embodiments 2-7, the first upper node and the first lower node configured to be connected to a direct current (DC) bus; and the second upper node and the second lower nod configured to be connected to an energy storage system (e.g., a battery).

Embodiment 9. The bidirectional inductive and conductive electrical apparatus according to any of embodiments 1-8, further comprising a controller controlling the control switch and managing a bidirectional power-flow between the DC bus and the energy storage system in both inductive and conductive modes.

Embodiment 10. An integrated bidirectional inductive and conductive power transfer system, comprising:
a primary side circuit including a first full bridge converter; and
a secondary side circuit including a second full bridge converter and transferring power wirelessly between the primary side circuit;
a controller determining a connection mode of the secondary side circuit by controlling a control switch of the second full bridge converter and determining an operation mode of the secondary side circuit.

Embodiment 11. The power transfer system according to embodiment 10, the connection mode being a wireless connection mode transferring power wirelessly under the ON state of the control switch, and the connection mode being a wired connection mode connecting the secondary side circuit to a direct current (DC) bus under the OFF state of the control switch.

Embodiment 12. The power transfer system according to embodiment 11, the controller controlling the first and second full bridge converters as a high frequency H-bridge converter (HFHBC) under the ON state of the control switch, and controlling the second full bridge converter as a bidirectional non-inverting buck boost converter (BNBBC) under the OFF state of the control switch.

Embodiment 13. The power transfer system according to any of embodiments 11-12, a charging mode and a discharging mode of the operation mode being controlled by the controller based on a voltage of the DC bus and a voltage of a battery configured to be connected to the second full bridge converter.

Embodiment 14. The power transfer system according to any of embodiments 11-13, the second full bridge converter including a first inverter leg configured to be connected to the DC bus and a second inverter leg configured to be connected to the battery, and the control switch disposed between the first inverter leg and the second inverter leg so as to selectively connect the first inverter leg and the second inverter leg.

Embodiment 15. The power transfer system according to embodiment 14, the first inverter leg including a first switch and a second switch connected to the first switch through a first middle node, and the second inverter leg including a third switch and a fourth switch connected to the third switch through a second middle node.

Embodiment 16. The power transfer system according to embodiment 15, further comprising an inductor component connected between the first middle node and the second middle node.

Embodiment 17. The power transfer system according to any of embodiments 12-16, the controller determining an inductance of the inductor component by adjusting a switching frequency of the BNBBC.

Embodiment 18. The power transfer system according to any of embodiments 16-17, the inductor component including a power pad functioning as a wireless coupler with respect to the primary side circuit and a compensation network connected between the power pad and the second full bridge converter.

Embodiment 19. An integrated bidirectional inductive and conductive power transfer system, comprising:
a secondary first switch disposed between a first upper node and a first middle node;
a secondary second switch disposed between the first middle node and a first lower node;
a secondary third switch disposed between a second upper node and a second middle node;
a secondary fourth switch disposed between the second middle node and a second lower node;
a control switch disposed between the first upper node and the second upper node;
a secondary inductor component disposed between the first middle node and the second middle node and including a secondary power pad and a secondary compensation network; and
a controller controlling the control switch such that the power transfer system operates under inductive power transfer mode by connecting the first upper node and the second upper node and operates under conductive power transfer mode by disconnecting the first upper node and the second upper node,
the first upper node and the first lower node configured to be connected to a direct current (DC) bus under the conductive power transfer mode, and
the second upper node and the second lower node configured to be connected to an energy storage system (e.g., a battery).

Embodiment 20. The power transfer system according to embodiment 19, further comprising:
a primary first switch and a primary second switch that are connected to each other in series;
a primary third switch and a primary fourth switch that are connected to each other in series; and
a primary inductor component connected to the primary first to fourth switches and including a primary power pad and a primary compensation network,
the primary first to fourth switches configured to the DC bus under the inductive power transfer mode.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

EXAMPLE

Figure 7:
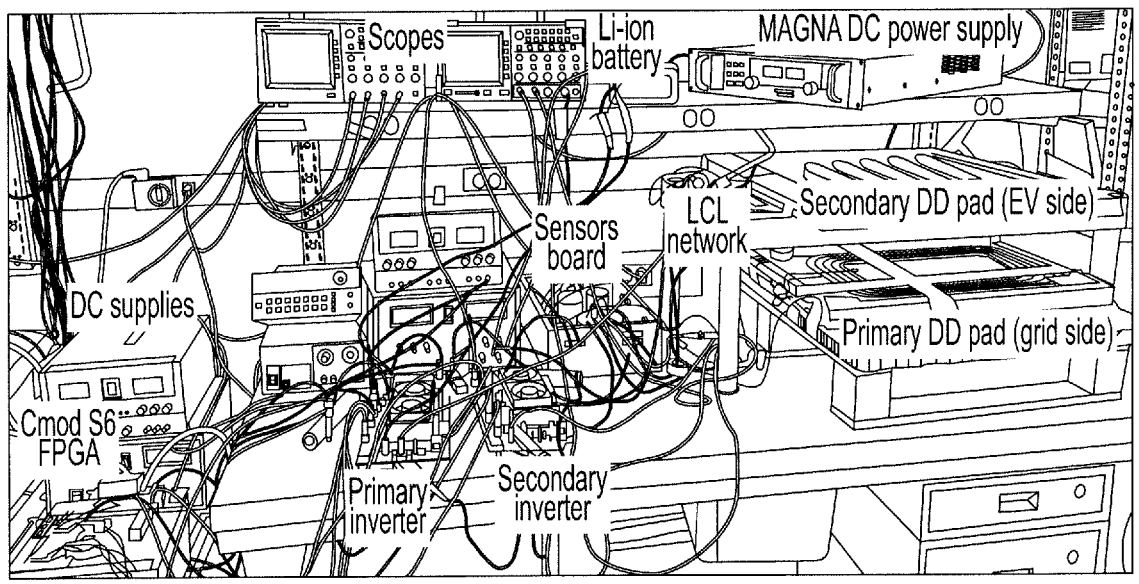
FIG. 7 shows a setup for test of a bidirectional inductive and conductive power transfer system according to an embodiment of the subject invention.

An embodiment of the IBICPTS was verified based on simulation and experimental tests. A prototype was built for the entire configuration and tested under different modes of operation, as depicted in FIG. 7. FIG. 7 shows a setup for test of a bidirectional inductive and conductive power transfer system according to an embodiment of the subject invention. It comprised two identical sides, and each one contained a HFHBC, double-D power pad, L-filter, and a compensation capacitor. A Li-ion battery module was used to emulate ESS's performance, and a DC supply in parallel with a resistive load was used to behave as a DC-bus. The system's control was implemented using Cmod S6 FPGA board.

The tests showed that embodiments of the subject invention present effective integrated configurations that allow an ESS to be charged and discharged, using both conductive and inductive stations. In an embodiment, the same hardware that is used for the inductive option is utilized to achieve the conductive connection, without adding extra components. The modifications can be applied to the secondary side of the wireless system to work as a non-inverted bidirectional DC-DC buck-boost converter that provides the two-way power-flow, during the wired connection. Such systems are able to work with the different stations and ESS's options. The switching among the ways of connection (wired or wireless), and the modes of operation (G2V and V2G) is achieved using a secondary controller placed on the ESS's side. The compensation network and the power pad of the wireless system are utilized to present the necessary inductor of the DC-DC converter, by adjusting the switching frequency of the DC-DC converter.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] T. A. Nergaard and J. B. Straubel, "Integrated inductive and conductive electrical charging system," US20130285602 A1, 31 Oct. 2013.
[2] A. A. S. Mohamed, C. R. Lashway, and O. Mohammed, "Modeling and Feasibility Analysis of Quasi-Dynamic WPT System for EV Applications," IEEE Trans. Transp. Electrification, vol. 3, no. 2, pp. 343-353, June 2017.
[3] A. Mohamed, A. Berzoy, and O. Mohammed, "Experimental Validation of Comprehensive Steady-state Analytical Model of Bidirectional WPT System in EVs Applications," IEEE Trans. Veh. Technol., vol. PP, no. 99, pp. 1-1, 2016.
[4] A. A. S. Mohamed, A. Berzoy, F. G. N. N. de Almeida, and O. Mohammed, "Steady-State Performance Assessment of Different Compensation Topologies in Two-way IWPT System for EV Ancillary Services," IEEE Trans. Ind. Appl., vol. PP, no. 99, pp. 1-1, 2017.
[5] U. K. Madawala and D. J. Thrimawithana, "A Bidirectional Inductive Power Interface for Electric Vehicles in V2G Systems," IEEE Trans. Ind. Electron., vol. 58, no. 10, pp. 4789-4796, October 2011.
[6] B. Esteban, M. Sid-Ahmed, and N. C. Kar, "A Comparative Study of Power Supply Architectures in Wireless EV Charging Systems," IEEE Trans. Power Electron., vol. 30, no. 11, pp. 6408-6422, November 2015.
[7] S. Li and C. C. Mi, "Wireless Power Transfer for Electric Vehicle Applications," IEEE J. Emerg. Sel. Top. Power Electron., vol. 3, no. 1, pp. 4-17, March 2015.
[8] W. Zhang and C. C. Mi, "Compensation Topologies of High-Power Wireless Power Transfer Systems," IEEE Trans. Veh. Technol., vol. 65, no. 6, pp. 4768-4778, June 2016.
[9] B. Sahu and G. A. Rincon-Mora, "A low voltage, dynamic, noninverting, synchronous buck-boost converter for portable applications," IEEE Trans. Power Electron., vol. 19, no. 2, pp. 443-452, March 2004.
[10] Fundamentals of Power Electronics|Robert W. Erickson Springer.
[11] T. A. Nergaard and J. B. Straubel, "Integrated inductive and conductive electrical charging system," US20130285602 A1, 31 Oct. 2013.

What is claimed is:

1. A bidirectional inductive and conductive electrical apparatus, comprising:
an inverter including a first inverter leg, a second inverter leg, and a control switch disposed between a first upper node of the first inverter leg and a second upper node of the second inverter leg; and
an inductor component connecting a first middle node of the first inverter leg and a second middle node of the second inverter leg,
the control switch configured to connect the first upper node to the second upper node under an ON state during inductive power transfer and configured to disconnect the first upper node from the second upper node under an OFF state during conductive power transfer,
the bidirectional inductive and conductive electrical apparatus being configured such that the inductor component is electrically connected to the first middle node and the second middle node during the inductive power transfer and during the conductive power transfer,
the first inverter leg including a first switch between the first upper node and the first middle node and a second switch between the first middle node and a first lower node of the first inverter; the second inverter leg including a third switch between the second upper node and the second middle node and a fourth switch between the second middle node and a second lower node of the second inverter; and the first lower node being connected to the second lower node, and
a switching frequency of the bidirectional inductive and conductive electrical apparatus being configured to be adjustable during operation to obtain an inductance across the first middle node and the second middle node that is equal to a predetermined desired value.

2. The bidirectional inductive and conductive electrical apparatus according to claim 1, the inductor component comprising a power pad and a compensation network.

3. The bidirectional inductive and conductive electrical apparatus according to claim 2, the compensation network being at least one of a series capacitor connected to the power pad in series, a parallel capacitor connected to the power pad in parallel, and a combination of the series capacitor and the parallel capacitor.

4. The bidirectional inductive and conductive electrical apparatus according to claim 2, the predetermined desired value being an equivalent inductance of the power pad and the compensation network.

5. The bidirectional inductive and conductive electrical apparatus according to claim 1, further comprising a controller adjusting the switching frequency.

6. The bidirectional inductive and conductive electrical apparatus according to claim 1, the first to fourth switches being semi-conductor switches.

7. The bidirectional inductive and conductive electrical apparatus according to claim 1, the first upper node and the first lower node configured to be connected to a direct current (DC) bus; and the second upper node and the second lower node configured to be connected to an energy storage system.

8. The bidirectional inductive and conductive electrical apparatus according to claim 7, further comprising a controller controlling the control switch and managing a bidirectional power-flow between the DC bus and the energy storage system in both inductive and conductive modes.

9. An integrated bidirectional inductive and conductive power transfer system, comprising:
a primary side circuit including a first full bridge converter;
a secondary side circuit including a second full bridge converter and transferring power wirelessly between the primary side circuit and the secondary side circuit; and
a controller determining a connection mode of the secondary side circuit by controlling a control switch of the second full bridge converter and determining an operation mode of the secondary side circuit,
the second full bridge converter comprising a first inverter leg and a second inverter leg,
the first inverter leg comprising a first switch and a second switch connected to the first switch through a first middle node, and the second inverter leg including a third switch and a fourth switch connected to the third switch through a second middle node,
the integrated bidirectional inductive and conductive power transfer system further comprising an inductor component connected between the first middle node and the second middle node,
the integrated bidirectional inductive and conductive power transfer system being configured such that the inductor component is electrically connected to the first middle node and the second middle node during inductive power transfer and during conductive power transfer, and
a switching frequency of the integrated bidirectional inductive and conductive power transfer system being configured to be adjustable by the controller during operation to obtain an inductance across the first middle node and the second middle node that is equal to a predetermined desired value; and the control switch being disposed between the first inverter leg and the second inverter leg so as to selectively connect the first inverter leg and the second inverter leg.

10. The power transfer system according to claim 9, the connection mode being a wireless connection mode transferring power wirelessly under the ON state of the control switch, and the connection mode being a wired connection mode connecting the secondary side circuit to a direct current (DC) bus under the OFF state of the control switch.

11. The power transfer system according to claim 10, the controller controlling the first and second full bridge converters as a high frequency H-bridge converter (HFHBC) under the ON state of the control switch, and controlling the second full bridge converter as a bidirectional non-inverting buck boost converter (BNBBC) under the OFF state of the control switch.

12. The power transfer system according to claim 11, a charging mode and a discharging mode of the operation mode being controlled by the controller based on a voltage of the DC bus and a voltage of a battery configured to be connected to the second full bridge converter.

13. The power transfer system according to claim 12, the first inverter leg being configured to be connected to the DC bus and the second inverter leg being configured to be connected to the battery.

14. The power transfer system according to claim 13, the inductor component including a power pad functioning as a wireless coupler with respect to the primary side circuit and a compensation network connected between the power pad and the second full bridge converter.

15. The power transfer system according to claim 14, the predetermined desired value being an equivalent inductance of the power pad and the compensation network.

16. An integrated bidirectional inductive and conductive power transfer system, comprising:
a secondary first switch disposed between a first upper node and a first middle node;
a secondary second switch disposed between the first middle node and a first lower node;
a secondary third switch disposed between a second upper node and a second middle node;
a secondary fourth switch disposed between the second middle node and a second lower node;
a control switch disposed between the first upper node and the second upper node;
a secondary inductor component disposed between the first middle node and the second middle node and including a secondary power pad and a secondary compensation network; and
a controller controlling the control switch such that the power transfer system operates under inductive power transfer mode by connecting the first upper node and the second upper node and operates under conductive power transfer mode by disconnecting the first upper node and the second upper node,
the first upper node and the first lower node configured to be connected to a direct current (DC) bus under the conductive power transfer mode,
the second upper node and the second lower node configured to be connected to an energy storage system,
the integrated bidirectional inductive and conductive power transfer system being configured such that the secondary inductor component is electrically connected to the first middle node and the second middle node during inductive power transfer and during conductive power transfer, and
a switching frequency of the integrated bidirectional inductive and conductive power transfer system being configured to be adjustable by the controller during operation to obtain an inductance across the first middle node and the second middle node that is equal to a predetermined desired value.

17. The power transfer system according to claim 16, further comprising:
a primary first switch and a primary second switch that are connected to each other in series;
a primary third switch and a primary fourth switch that are connected to each other in series; and
a primary inductor component connected to the primary first to fourth switches and including a primary power pad and a primary compensation network,
the primary first to fourth switches configured to the DC bus under the inductive power transfer mode.

18. The power transfer system according to claim 16, the predetermined desired value being an equivalent inductance of the secondary power pad and the secondary compensation network.

* * * * *